United States Patent [19]
Hendriks et al.

[11] Patent Number: 5,910,212
[45] Date of Patent: Jun. 8, 1999

[54] PROCESS FOR PREPARING AN OPEN-GRADED ASPHALT COMPOSITION

[75] Inventors: Henricus Engelbertus Johannes Hendriks; Dirk Adriaan Stoker, both of Amsterdam, Netherlands

[73] Assignee: Shell Oil Company, Houston, Tex.

[21] Appl. No.: 09/059,746

[22] Filed: Apr. 14, 1998

[30] Foreign Application Priority Data

Apr. 21, 1997 [EP] European Pat. Off. .............. 97302702

[51] Int. Cl.$^6$ ................................................. C09D 195/00
[52] U.S. Cl. ......................................................... 106/281.1
[58] Field of Search .......................................... 106/281.1

[56] References Cited

U.S. PATENT DOCUMENTS

| | | | |
|---|---|---|---|
| Re. 17,985 | 3/1931 | Radcliffe | 106/281.1 |
| 1,999,178 | 4/1935 | Baskin | 106/281.1 |
| 3,832,200 | 8/1974 | Kennel et al. | 106/281 R |
| 4,762,565 | 8/1988 | Graf | 106/281 R |
| 5,114,483 | 5/1992 | Graf | 106/281.1 |
| 5,118,733 | 6/1992 | Gelles et al. | 524/68 |
| 5,743,950 | 4/1998 | Hendriks et al. | 106/281.1 |

FOREIGN PATENT DOCUMENTS

| | | | |
|---|---|---|---|
| 0330281 B1 | 2/1989 | European Pat. Off. | C08L 57/10 |
| 589740 | 8/1993 | European Pat. Off. | E01C 7/18 |

*Primary Examiner*—David Brunsman

[57] ABSTRACT

The present invention provides a process for preparing an open-graded asphalt composition which comprises adding a very hard binder component to a mixture of a non-emulsified very soft binder component and aggregate at a temperature of less than 140° C.

7 Claims, No Drawings

PROCESS FOR PREPARING AN OPEN-GRADED ASPHALT COMPOSITION

FIELD OF THE INVENTION

The present invention relates to a process for preparing an asphalt composition.

BACKGROUND OF THE INVENTION

The temperature at which a bitumen is mixed with aggregate to produce an asphalt composition ready for use on roads is normally in the range of 140 to 170° C., although some documents, e.g. U.S. Pat. No. 3,832,200, teach that even higher temperatures should be applied. Since, it is nowadays well appreciated that such hot bitumens may create potential health, safety and environmental hazards, much effort is directed in this field of technology to the development of asphalt compositions which can be handled at lower temperatures.

In this respect reference can be made to the application of bitumen emulsions which are prepared by mixing a hot bitumen with an aqueous emulsifier solution. These bitumen emulsions can normally be mixed with aggregate at a temperature much lower than 140° C., in which way the above-mentioned hazards are much better controlled. Asphalt compositions with relatively high void contents, so-called open-graded asphalt, have the advantage that they are highly permeable to water. This means that water can run away more quickly from the road surface during service. A disadvantage of the high void content is that open-graded asphalt loses coarse aggregate from the road surface rather easily, so called fretting of the road surface. It further tends to lose internal cohesion more easily which will eventually lead to collapse of the material and lack of internal stability, often visible as deformation of the road surface, i.e. rutting. Moreover, strength of these asphalts is only developed slowly.

U.S. Pat. No. 5,114,483, U.S. Pat. No. 4,762,565 and EP-A-589,740 relate to the preparation of asphalt with the help of an emulsion of a soft binder component and an emulsion of a hard binder component. The process of the present invention has the advantage that it is not necessary to make an emulsion of the soft binder component. Surprisingly, it has now been found that open-graded asphalt compositions can be produced having a good resistance against fretting and in addition a good creep (rutting) and fatigue performance, by adding a hard binder component to a mixture of a non-emulsified soft binder component and aggregate at a relatively low temperature.

SUMMARY OF THE INVENTION

Accordingly, the present invention relates to a process for preparing an open-graded asphalt composition which comprises adding a hard binder component having a penetration of less than 50 dmm to a mixture of a non-emulsified soft binder component having a viscosity of less than 300 mPa.s (at 100° C.) and aggregate at a temperature of less than 140° C. Suitably, the temperature applied is less than 100° C.

DETAILED DESCRIPTION OF THE INVENTION

The hard binder component is preferably added to the mixture as a powder. In that case the hard binder component can very attractively be added to the mixture at a temperature of less than 50° C., preferably at ambient temperature. If the hard binder component is used as an emulsion (or suspension), the emulsion (or suspension) suitably contains less than 50% by mass of water, preferably less than 40% by mass. In that case the hard binder component can suitably be added to the mixture of a temperature of less than 100° C., preferably at a temperature in the range of from ambient temperature to 80° C. When use is made of an emulsion, the emulsion may be a cationic, an anionic or a non-ionic emulsion.

The soft binder component can suitably be added to the aggregate at a relatively low temperature, i.e. a temperature of less than 120° C. Suitably, the soft binder component is added to the aggregate at a temperature of al: least 70° C., preferably at a temperature in the range of from 80 to 115° C., more preferably in the range of from 85 to 110° C.

In the context of the present invention, a hard binder component is defined as a binder component having a penetration (PEN) of less than 50 dmm (as measured by ASTM D 5 at 25° C.). The hard binder component has preferably a penetration of less than 10 dmm and a softening point of less than 100° C. (as measured by ASTM D 36), preferably less than 80° C.

In the context of the present invention a soft binder component is defined as a binder component having a viscosity (as determined by ASTM D 2171 at 100° C.) of less than 300 mPa.s, preferably less than 270 mPa.s, most preferably less than 200 mPa.s (as determined by ASTM 2171 at 100° C.).

Preferably, both the hard and soft binder component are bitumen components. However, in another suitable embodiment of the present invention the hard binder component is a resin, for instance a coumarone-indene resin, and the soft binder component is a low viscous component (a flux). The resins may be any of the modified resins described in EP-B-0330281, which is hereby incorporated by reference.

The binder components may suitably contain in addition a film formation improver (e.g. butyldi-oxitol), a non-ionic emulsier (e.g. nonylphenol-ethoxylate) or an adhesion improver (e.g. an amine such as an alkylamidoamine), preferably an alkylamidoamine. Such additional compounds are preferably added to the soft binder component, and are suitably present in an amount of less than 5% wt, preferably in an amount in the range of from 0.25 to 1.0% wt, based on total binder content. Also mixtures of these additional compounds can suitably be used. In this way an even further improved resistance against fretting is established.

The bitumen components may be naturally occurring bitumens or derived from a mineral oil. Also petroleum pitches obtained by a cracking process and coal tar can be used as well as blends of bituminous materials. Examples of suitable bitumens include distillation or "straight run" bitumens, precipitation bitumens, e.g. propane bitumens, blown bitumens, e.g. catalytically blown bitumens, and mixtures thereof. Other suitable bitumen compositions include mixtures of one or more of these bitumens with extenders (fluxes) such as petroleum extracts, e.g. aromatic extracts, distillates or residues, or with oils.

The hard and soft binder components may suitably contain any polymer modifier taught in the art, such as for instance a thermoplastic rubber, suitably in an amount in the range of from 1 to 10% by weight. The amounts of the hard and soft binder components used may vary between wide limits, and strongly depend on the penetration grade desired for the binder of the asphalt composition. The hard binder component can for instance suitably be present in an amount of 10 to 90% wt, based on total binder, and, conversely, the amount of soft binder component would be 90 to 10% wt.

The asphalt composition prepared in accordance with the present invention is in particular suitable for use in road applications. The asphalt composition prepared in accordance with the present invention can suitably be used in the construction of base coarse materials or wearing coarse materials. The binder (the mixture of hard and soft components) of the asphalt composition prepared in accordance with the present invention has suitably a penetration which varies between 10 to 300 dmm, preferably between 50 to 150 dmm (as measured by ASTM D 5 at 25° C.).

The bitumen compositions may also contain other ingredients such as fillers, e.g. carbon black, silica and calcium carbonate, stabilisers, antioxidants, pigments and solvents which are known to be useful in bitumen compositions. The asphalt compositions prepared in accordance with the present invention comprise aggregate in amounts taught in the art.

The open-graded asphalt compositions according to the present invention have a void content of more than. 10%, preferably more than 15%, most preferably in the range of from 20 to 30% (very open-graded asphalt compositions). Suitable aggregates include those normally applied in open-graded asphalt compositions.

The present invention will now be illustrated by way of the following Examples.

Example 1

A very open-graded asphalt composition with 4.5% wt. 100 pen grade binder on 100% wt. aggregate was prepared in accordance with the present invention as follows. An amount of 1 kg of a low viscous binder component having a viscosity of 260 mPa.s at 100° C. (Statfjord short residue) was pre-blended at 100° C. with 10 g of Wetfix (an alkylamido amine; ex Berol Nobel). 19.6 g of the pre-blended low viscous binder component was added to 924.8 g of aggregate in a Hobart mixer operating at a temperature of 100° C. at about 35 rpm. The aggregate consisted of 5.7% nm of Filler Rhecal 60 (<63 μm), 10.1%m crushed sand (0.063-2 mm) and 84.2% m Dutch Crushed Gravel (8–11 mm).

Subsequently, to the mixture so obtained 36.3 g of a suspension of hard binder component was added containing 22.1 g of an 10/20 pen grade bitumen (bitumen content in suspension 60.9% m). The suspension was prepared in a ScanRoad (Akzo-Nobel) colloid mill equipped with a heat-exchanger which mill was operated at a pressure of 2 bar, a bitumen temperature of 165° C., an emulsifier solution temperature of 60° C. and 9000 rpm. The 10/20 pen bitumen had a penetration of 12 dmm, (as measured by ASTMD D 5 at 25° C.) and a softening point of 70° C. (as measured according to ASTMD D 36).

The emulsifier solution contained 3.0% of the commercially available emulsifier Redicote EM26 and had a pH of 1.5. The solution was acidified using hydrochloric acid.

The very open-graded asphalt composition so obtained was then poured into a mould of a gyratory compactor. The asphalt composition was then compacted at a temperature between 70 and 100° C. at a compaction pressure of 3.5 bar, compaction angle 1.5 for 100 cycles. After compaction the asphalt sample obtained was allowed to cool down to ambient temperature and removed from the mould.

Example 2

For reasons of comparison a conventional hot mix very open-graded asphalt composition with 4.5% wt. 100 pen grade binder on 100% wt. aggregate was prepared as follows. A 100 pen binder was prepared by blending the low viscous binder component (Statfjord short residue) and a hard bitumen component (10/20 pen grade). 41.6 g of the blend so obtained was added to 924.8 g of the aggregate composition as described in Example 1 at a temperature of 140° C. The asphalt composition was then gyratory compacted at 130° C. at a compaction pressure of 3.5 bar, compaction angle 1.5 for 100 cycles. After compaction the asphalt sample was allowed to cool down to ambient temperature and removed from the mould.

Testing experiments

The fretting performances of the very open graded asphalt compositions prepared in examples 1 and 2 were then determined in the (modified) Californian abrasion test at 4° C., which test is known by the person skilled in the art. Cylindrical test specimens, diameter 101.6 mm, height 50 mm, were used in the test. The performance data of the asphalt compositions are shown in Table 1.

It will be clear from these data that in accordance with the present invention attractive asphalt compositions can be prepared at advantageously low temperatures. Moreover, it is observed that the asphalt composition prepared in accordance with the present invention (Example 1) appears to be as homogeneous as the conventional very open-graded asphalt composition (Example 2), and the degree of coating of the aggregate is similar in both instances.

TABLE 1

|  | voids % | Californian abrasion test at 4° C., [g] |
|---|---|---|
| Example 1 | 23 | 43.1 ± 0.1 |
| Example 2 | 24 | 37.8 ± 1.5 |

We claim:

1. Process for preparing an open-graded asphalt composition which comprises adding a hard binder component having a penetration of less than 50 dmm to a mixture of a non-emulsified soft binder component having a viscosity of less than 300 mPa.s (at 100° C.) and aggregate at a temperature of less than 140° C.

2. Process according to claim 1, wherein the hard binder component is added to the mixture at a temperature of less than 100° C.

3. Process according to claim 1, wherein the hard binder component is added to the mixture as a powder.

4. Process according to claim 3, wherein the hard binder component is added to the mixture at a temperature of less than 50° C.

5. Process according to claim 1, wherein the soft binder component is added to the aggregate at a temperature of less than 120° C.

6. Process according to claim 5, wherein the soft binder component is added at a temperature in the range of from 80 to 115° C.

7. Process according to claim 1, wherein the hard and soft binder components are bitumen components.

* * * * *